US012641617B2

(12) United States Patent
Zhang et al.

(10) Patent No.: US 12,641,617 B2
(45) Date of Patent: May 26, 2026

(54) TRANSMITTING CONTROL INFORMATION ASSOCIATED WITH DYNAMIC SUBBAND FULL DUPLEX

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/334,224

(22) Filed: Jun. 13, 2023

(65) Prior Publication Data

US 2024/0422786 A1 Dec. 19, 2024

(51) Int. Cl.
| | |
|---|---|
| *H04W 72/23* | (2023.01) |
| *H04L 5/00* | (2006.01) |
| *H04W 72/0446* | (2023.01) |
| *H04W 72/1268* | (2023.01) |
| *H04L 5/14* | (2006.01) |

(52) U.S. Cl.
CPC ........... *H04W 72/23* (2023.01); *H04L 5/0055* (2013.01); *H04W 72/0446* (2013.01); *H04W 72/1268* (2013.01); *H04L 5/14* (2013.01)

800

(58) Field of Classification Search
CPC ............. H04W 72/23; H04W 72/0446; H04W 72/1268; H04L 5/0055; H04L 5/14; H04L 5/0092; H04L 5/1469; H04L 5/16
USPC .......................................................... 370/329
See application file for complete search history.

(56) References Cited

U.S. PATENT DOCUMENTS

| | | | |
|---|---|---|---|
| 2019/0166621 A1* | 5/2019 | Yerramalli | .......... H04W 74/004 |
| 2021/0051701 A1* | 2/2021 | Fakoorian | ............. H04W 72/23 |
| 2023/0163937 A1* | 5/2023 | Awadin | ..................... H04L 5/14 |
| | | | 370/329 |
| 2023/0292294 A1* | 9/2023 | Rudolf | .................. H04L 5/0053 |

* cited by examiner

*Primary Examiner* — Mang Hang Yeung
(74) *Attorney, Agent, or Firm* — QUALCOMM Incorporated

(57) ABSTRACT

Various aspects of the present disclosure generally relate to wireless communication. In some aspects, a user equipment (UE) may receive control information associated with dynamic subband full duplex (SBFD), wherein the control information indicates whether a downlink reception outside a semi-statically configured downlink subband or an uplink transmission outside a semi-statically configured uplink subband is allowed, or whether a symbol is an SBFD symbol or a non-SBFD symbol. The UE may perform a communication based at least in part on the control information. Numerous other aspects are described.

30 Claims, 13 Drawing Sheets

400
402:
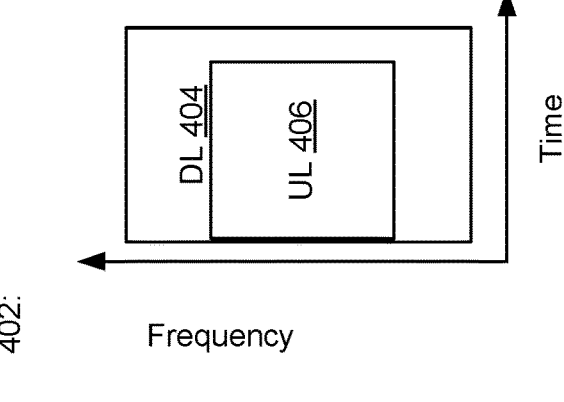
408:
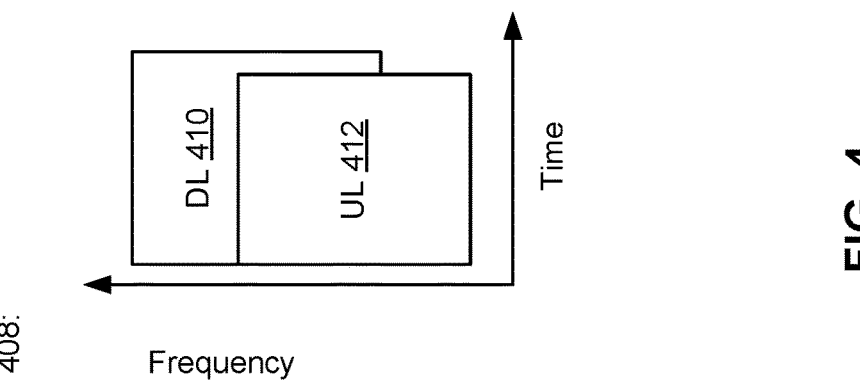
414:
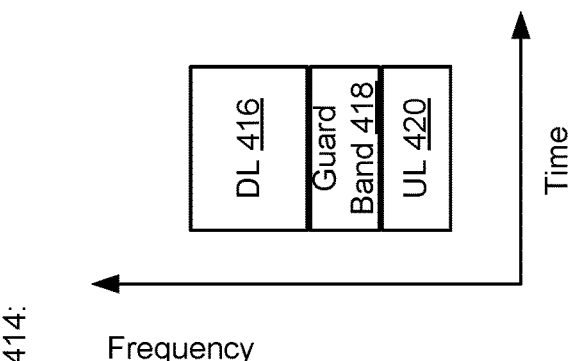
FIG. 4

500
502:
FD gNB and HD UEs
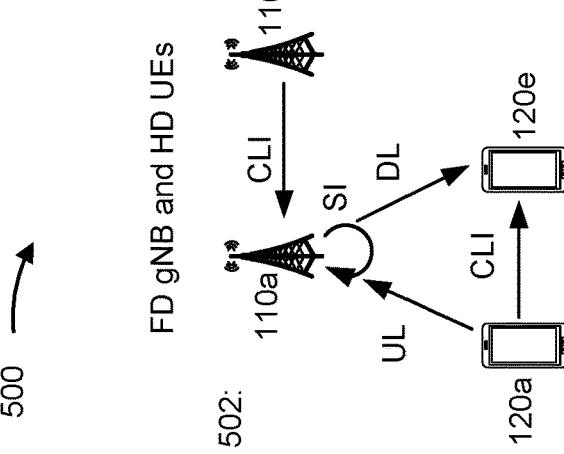
504:
FD gNB and FD UEs
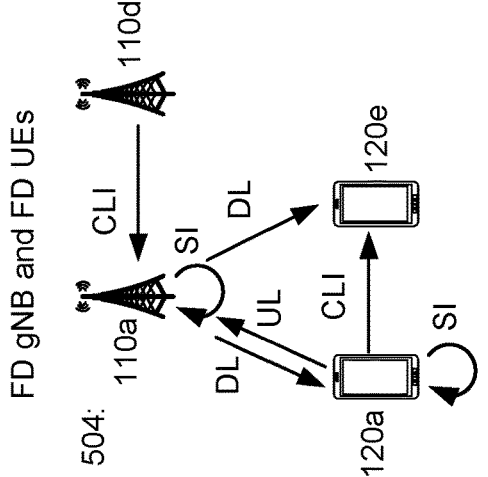
508:
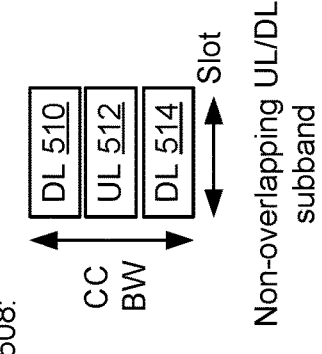
506:
FD gNB (M-TRP) and SBFD UEs
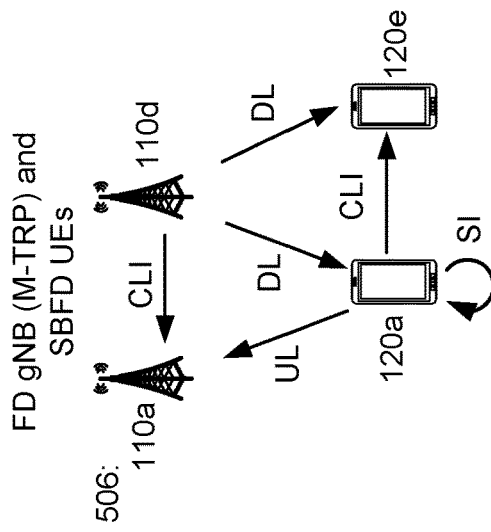
FIG. 5

600

700

800

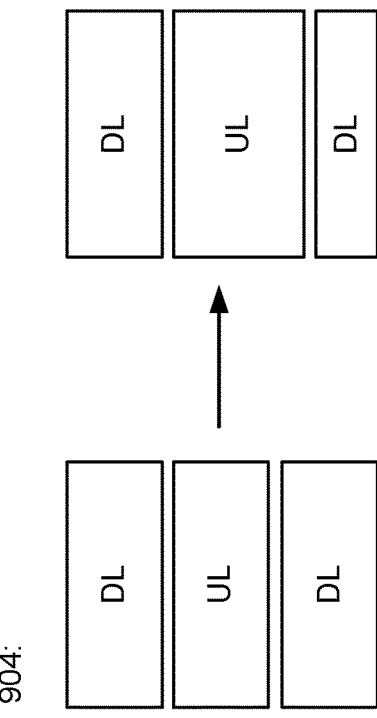
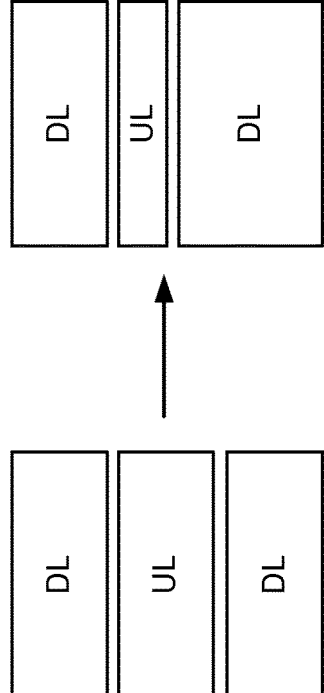
FIG. 9

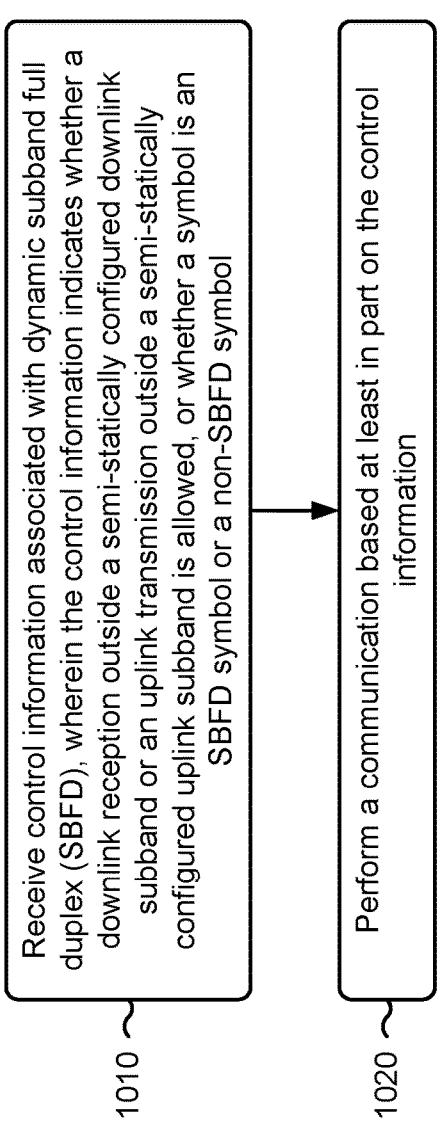

1010 — Receive control information associated with dynamic subband full duplex (SBFD), wherein the control information indicates whether a downlink reception outside a semi-statically configured downlink subband or an uplink transmission outside a semi-statically configured uplink subband is allowed, or whether a symbol is an SBFD symbol or a non-SBFD symbol 1020 — Perform a communication based at least in part on the control information

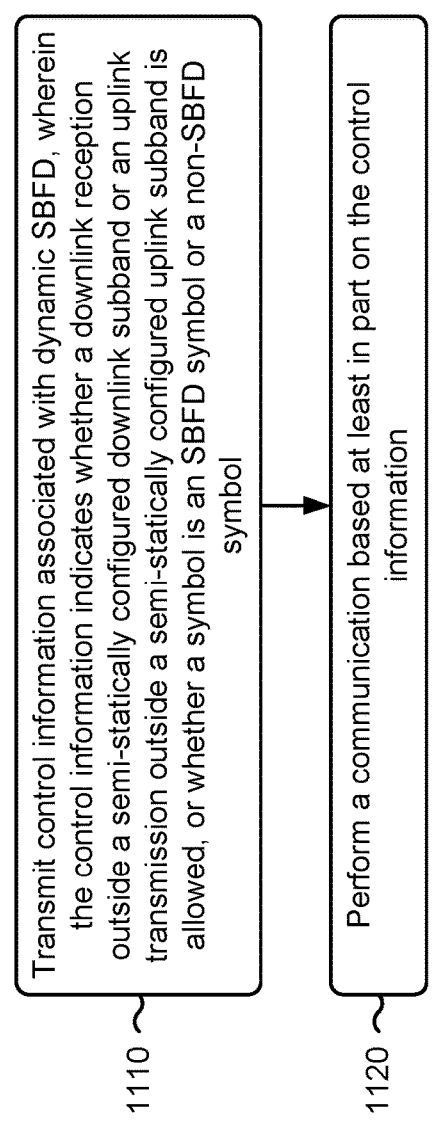

1110 — Transmit control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol 1120 — Perform a communication based at least in part on the control information

TRANSMITTING CONTROL INFORMATION ASSOCIATED WITH DYNAMIC SUBBAND FULL DUPLEX

FIELD OF THE DISCLOSURE

Aspects of the present disclosure generally relate to wireless communication and to techniques and apparatuses for transmitting control information associated with dynamic subband full duplex (SBFD).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories and one or more processors coupled to the one or more memories, the one or more processors individually or collectively configured to: receive control information associated with dynamic subband full duplex (SBFD), wherein the control information indicates whether a downlink reception outside a semi-statically configured downlink subband or an uplink transmission outside a semi-statically configured uplink subband is allowed, or whether a symbol is an SBFD symbol or a non-SBFD symbol; and perform a communication based at least in part on the control information.

In some implementations, an apparatus for wireless communication at a network node includes one or more memories and one or more processors coupled to the one or more memories, the one or more processors individually or collectively configured to: transmit control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and perform a communication based at least in part on the control information.

In some implementations, a method of wireless communication performed by a UE includes receiving control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and performing a communication based at least in part on the control information.

In some implementations, a method of wireless communication performed by a network node includes transmitting control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and performing a communication based at least in part on the control information.

In some implementations, a non-transitory computer-readable medium storing a set of instructions for wireless communication includes one or more instructions that, when executed by one or more processors of a UE, cause the UE to: receive control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and perform a communication based at least in part on the control information.

In some implementations, a non-transitory computer-readable medium storing a set of instructions for wireless communication includes one or more instructions that, when executed by one or more processors of a network node, cause the network node to: transmit control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and perform a communication based at least in part on the control information.

In some implementations, an apparatus for wireless communication includes means for receiving control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and means for performing a communication based at least in part on the control information.

In some implementations, an apparatus for wireless communication includes means for transmitting control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and means for performing a communication based at least in part on the control information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating examples of full duplex (FD) communications, in accordance with the present disclosure.

FIG. 5 is a diagram illustrating examples of FD communications, in accordance with the present disclosure.

FIGS. 8-9 are diagrams illustrating examples associated with transmitting control information associated with dynamic SBFD, in accordance with the present disclosure.

FIGS. 10-11 are diagrams illustrating example processes associated with transmitting control information associated with dynamic SBFD, in accordance with the present disclosure.

DETAILED DESCRIPTION

Figure 1:
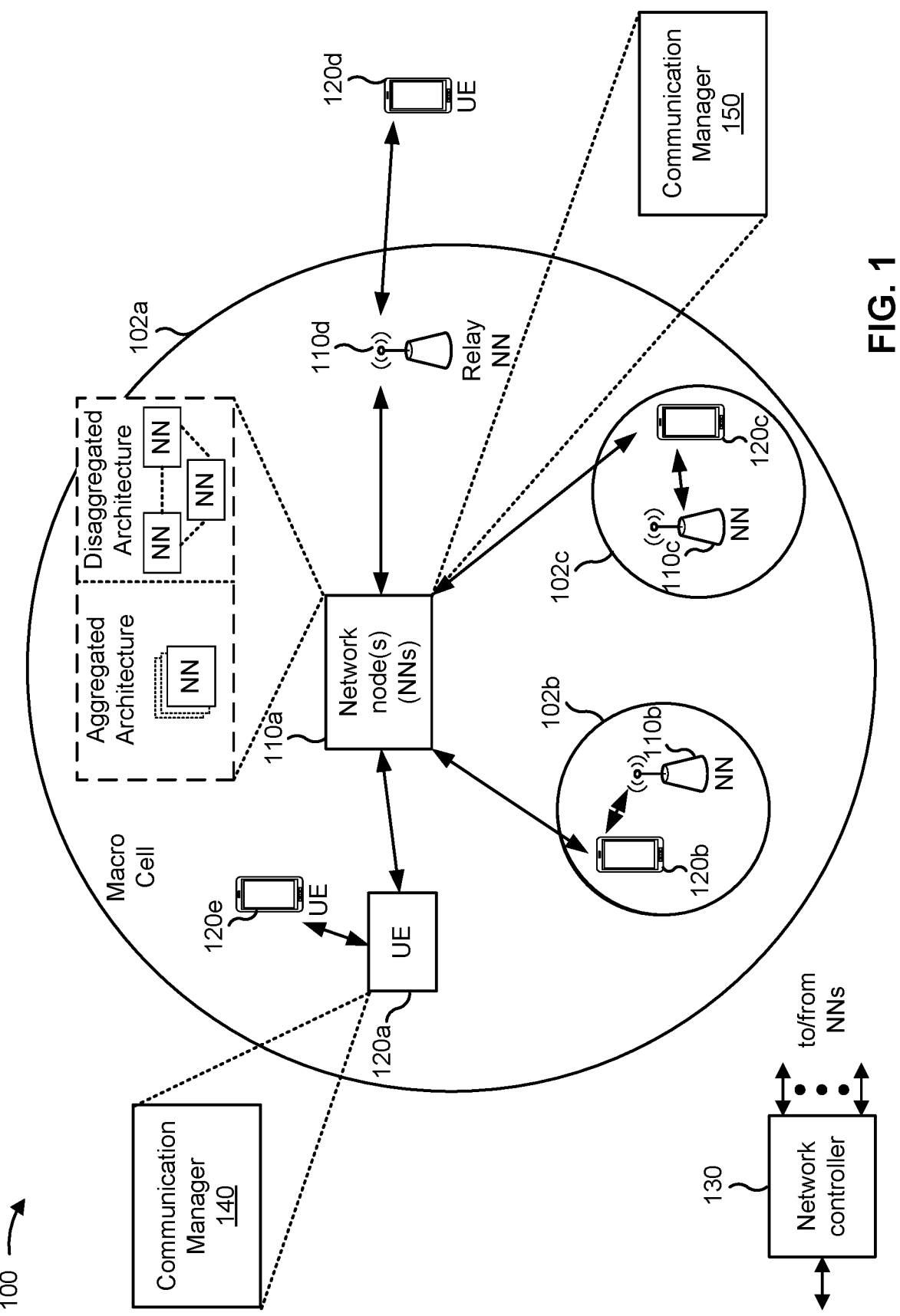
FIG. 1 is a diagram illustrating an example of a wireless network, in accordance with the present disclosure.

In dynamic subband full duplex (SBFD), a semi-statically configured SBFD slot may be dynamically updated to a downlink slot or a flexible slot. Additionally, or alternatively, in dynamic SBFD, a downlink slot or a flexible slot may be dynamically updated to an SBFD slot. Dynamic SBFD may be achieved using downlink control information (DCI) (e.g., scheduling DCI or non-scheduling DCI). However, in some cases, the DCI may provide insufficient time for a network node and/or a UE to prepare for downlink receptions outside of a semi-statically configured downlink subband, and/or uplink transmissions outside of a semi-statically configured uplink subband, which may degrade a performance of the network node and/or the UE. Further, in some cases, the DCI may not trigger an acknowledgement (ACK) or negative acknowledgement (NACK) (ACK/NACK) transmission by the UE, which may result in the network node being unaware when the DCI is not successfully received by the UE. In such a scenario, the performance of the network node and/or the UE may also be degraded.

Various aspects relate generally to transmitting control information associated with dynamic SBFD. Some aspects more specifically relate to transmitting DCI, such as a scheduling DCI or a non-scheduling DCI, for dynamic SBFD. In some examples, a UE may receive, from a network node, control information associated with dynamic SBFD. The UE may receive the control information via the scheduling DCI or the non-scheduling DCI. The control information may indicate whether a downlink reception outside a semi-statically configured downlink subband or an uplink transmission outside a semi-statically configured uplink subband is allowed, or whether a symbol is an SBFD symbol or a non-SBFD symbol. In some aspects, the scheduling DCI may indicate a scheduling offset, which may provide a time period for the UE and/or the network node to prepare for the downlink reception outside the semi-statically configured downlink subband or the uplink transmission outside the semi-statically configured uplink subband. In some aspects, the non-scheduling DCI may indicate an ACK/NACK location and an ACK/NACK resource for the non-scheduling DCI. The UE may transmit, to the network node, an ACK/NACK based at least in part on the control information. For example, the UE may transmit the ACK/NACK based at least in part on the ACK/NACK location and the ACK/NACK resource for the non-scheduling DCI. The UE may perform a communication based at least in part on the control information. For example, the UE may perform the downlink reception or the uplink transmission based at least in part on the control information. The UE may perform the communication in the SBFD symbol or in the non-SBFD symbol, based at least in part on the control information.

Particular aspects of the subject matter described in this disclosure can be implemented to realize one or more of the following potential advantages. In some examples, by transmitting the control information associated with dynamic SBFD, the described techniques can be used to improve a performance of the UE and/or the network node. The scheduling offset, which may be indicated in the scheduling DCI, may enable the time period for the UE and/or the network node to perform various tasks, such as retuning some radio frequency (RF)/baseband blocks, adjusting an uplink timing advance (TA), switching a downlink-to-uplink direction, and/or adopting a new antenna configuration. Such tasks may improve the performance of the UE and/or the network node. Further, the ACK/NACK location and the ACK/NACK resource, which may be indicated in the non-scheduling DCI, may enable ACK/NACK transmissions by the UE, thereby improving a performance of the UE and/or the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and perform a communication based at least in part on the control information. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and perform a communication based at least in part on the control information. Additionally, or alternatively, the communication manager 150 may perform one or more other operations described herein.

As indicated above, FIG. 1 is provided as an example. Other examples may differ from what is described with regard to FIG. 1.

Figure 2:
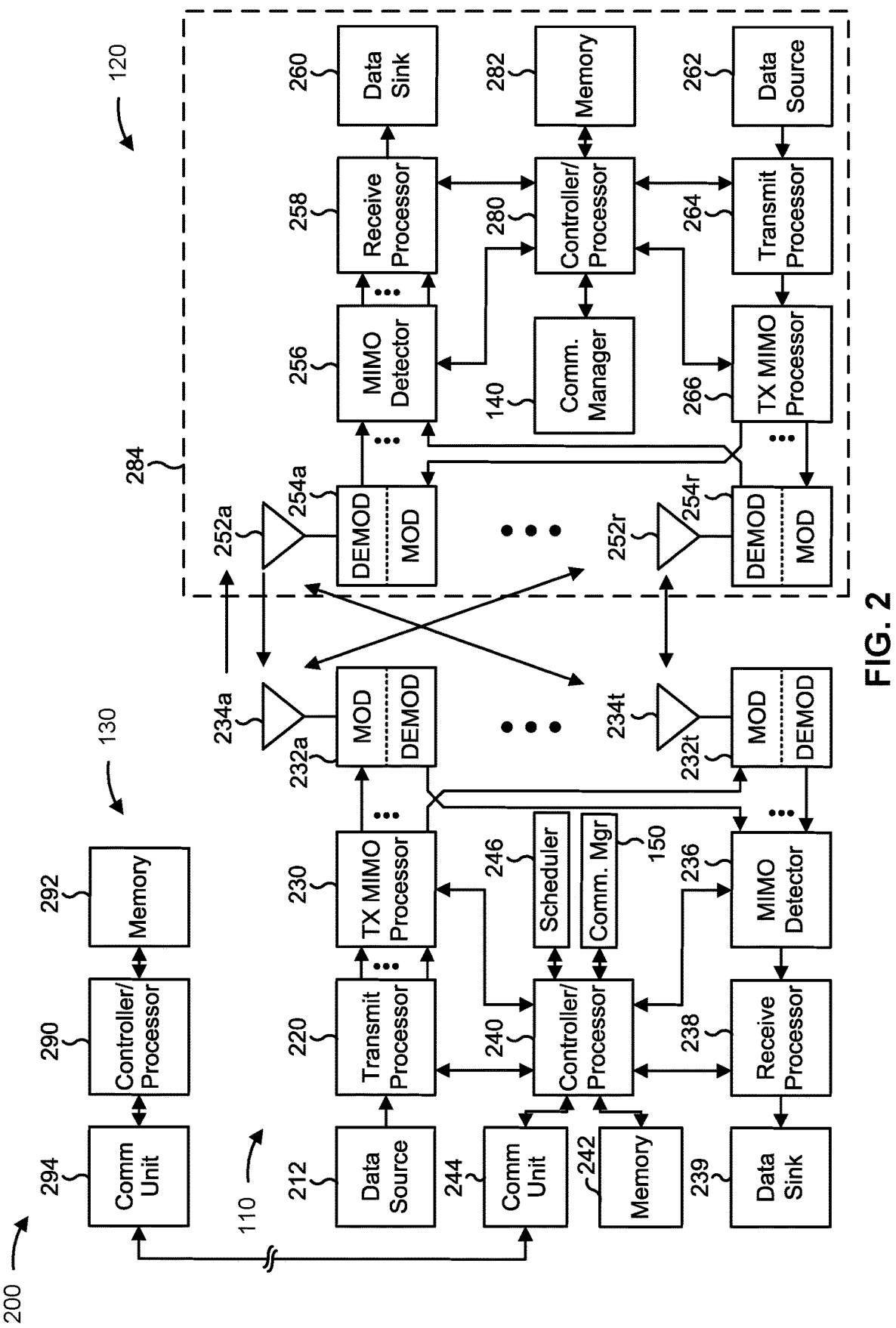
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the network node 110, the controller/processor 280 of the UE 120, and/or any other component(s) of FIG. 2 may perform one or more techniques associated with transmitting control information associated with dynamic SBFD, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and/or means for performing a communication based at least in part on the control information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol; and/or means for performing a communication based at least in part on the control information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
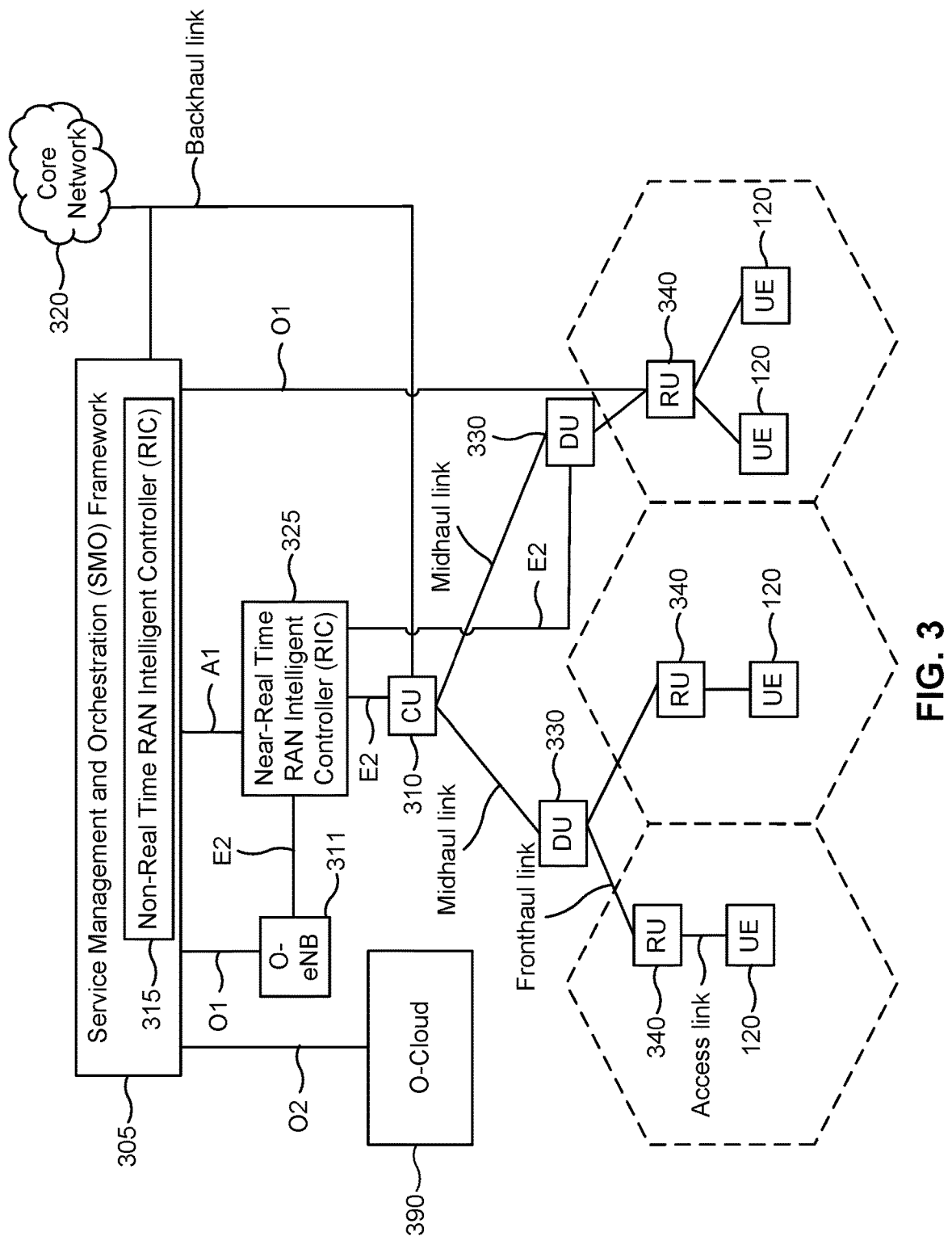
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A full duplex (FD) operation may involve an in-band full duplex (IBFD) operation, in which a transmission and a reception may occur on the same time and frequency resource. A downlink direction and an uplink direction may share the same IBFD time/frequency resource based at least in part on a full or partial overlap. Alternatively, the FD operation may involve an SBFD (or flexible duplex) operation, in which a transmission and a reception may occur at the same time but on different frequency resources. A downlink resource may be separated from an uplink resource in a frequency domain. In the SBFD operation, no downlink and uplink overlap in frequency may occur.

FIG. 4 is a diagram illustrating examples 400 of FD communications, in accordance with the present disclosure.

As shown by reference number 402, a downlink resource 404 and an uplink resource 406 may share the same IBFD time/frequency resource based at least in part on a full overlap. As shown by reference number 408, a downlink resource 410 and an uplink resource 412 may share the same IBFD time/frequency resource based at least in part on a partial overlap. As shown by reference number 414, a downlink resource 416 and an uplink resource 420 may be associated with a same time but different frequencies. The downlink resource 416 and the uplink resource 420 may be separated by a guard band 418.

As indicated above, FIG. 4 is provided as an example. Other examples may differ from what is described with regard to FIG. 4.

FIG. 5 is a diagram illustrating examples 500 of FD communications, in accordance with the present disclosure.

As shown by reference number 502, an FD network node (e.g., network node 110a) may communicate with half duplex (HD) UEs. The FD network node may be subjected to cross-link interference (CLI) from another FD network node (e.g., network node 110d). The CLI from the other FD network node may be inter-network node CLI. The FD network node may experience self-interference (SI). The FD network node may receive an uplink transmission from a first HD UE (e.g., UE 120a), and the FD network node may transmit a downlink transmission to a second HD UE (e.g., UE 120c). The FD network node may receive the uplink transmission and transmit the downlink transmission on the same slot (e.g., a simultaneous reception/transmission). The second HD UE may be subjected to CLI from the first HD UE (e.g., inter-UE CLI).

As shown by reference number 504, an FD network node (e.g., network node 110a) may communicate with FD UEs. The FD network node may be subjected to CLI from another FD network node (e.g., network node 110d). The FD network node may experience SI. The FD network node may transmit a downlink transmission to a first FD UE (e.g., UE 120a), and the FD network node may receive an uplink transmission from the first FD UE at the same time as the downlink transmission. The FD network node may transmit a downlink transmission to a second FD UE (e.g., UE 120e). The second HD UE may be subjected to CLI from the first HD UE. The first UE may experience SI.

As shown by reference number 506, a first FD network node (e.g., network node 110a), which may be associated with multiple transmission reception points (TRPs), may communicate with SBFD UEs. The first FD network node may be subjected to CLI from a second FD network node (e.g., network node 110d). The first FD network node may receive an uplink transmission from a first SBFD UE (e.g., UE 120a). The second FD network node may transmit downlink transmissions to both the first SBFD UE and a second SBFD UE (e.g., UE 120c). The second SBFD UE may be subjected to CLI from the first SBFD UE. The first SBFD UE may experience SI.

As shown by reference number 508, an SBFD slot may be associated with a non-overlapping uplink/downlink subband. The SBFD slot may be associated with a simultaneous transmission/reception of a downlink/uplink on a sub-band basis. Within a component carrier bandwidth, an uplink resource 512 may be in between, in a frequency domain, a first downlink resource 510 and a second downlink resource 514. The first downlink resource 510, the second downlink resource 514, and the uplink resource 512 may all be associated with the same time.

An SBFD operation may increase an uplink duty cycle, which may result in a latency reduction (e.g., a downlink signal may be received in uplink-only slots, which may enable latency savings) and uplink coverage improvement. The SBFD operation may improve a system capacity, resource utilization, and/or spectrum efficiency. The SBFD operation may enable a flexible and dynamic uplink/downlink resource adaptation according to uplink/downlink traffic in a robust manner.

As indicated above, FIG. 5 is provided as an example. Other examples may differ from what is described with regard to FIG. 5.

A network node may define a slot pattern, such as a "DDDDU" slot pattern, where "D" is a downlink slot and "U" is an uplink slot. The network node may semi-statically configure an SBFD slot in a downlink slot of the "DDDDU" slot pattern. Alternatively, the network node may semi-statically configure the SBFD slot in a flexible slot ("F") of a slot pattern. In dynamic SBFD, the network node may change the semi-statically configured SBFD slot back to the downlink slot or the flexible slot. In dynamic SBFD, the network node may add another SBFD slot. For example, the network node may dynamically configure another SBFD slot in another downlink slot of the "DDDDU" slot pattern.

Figure 6:
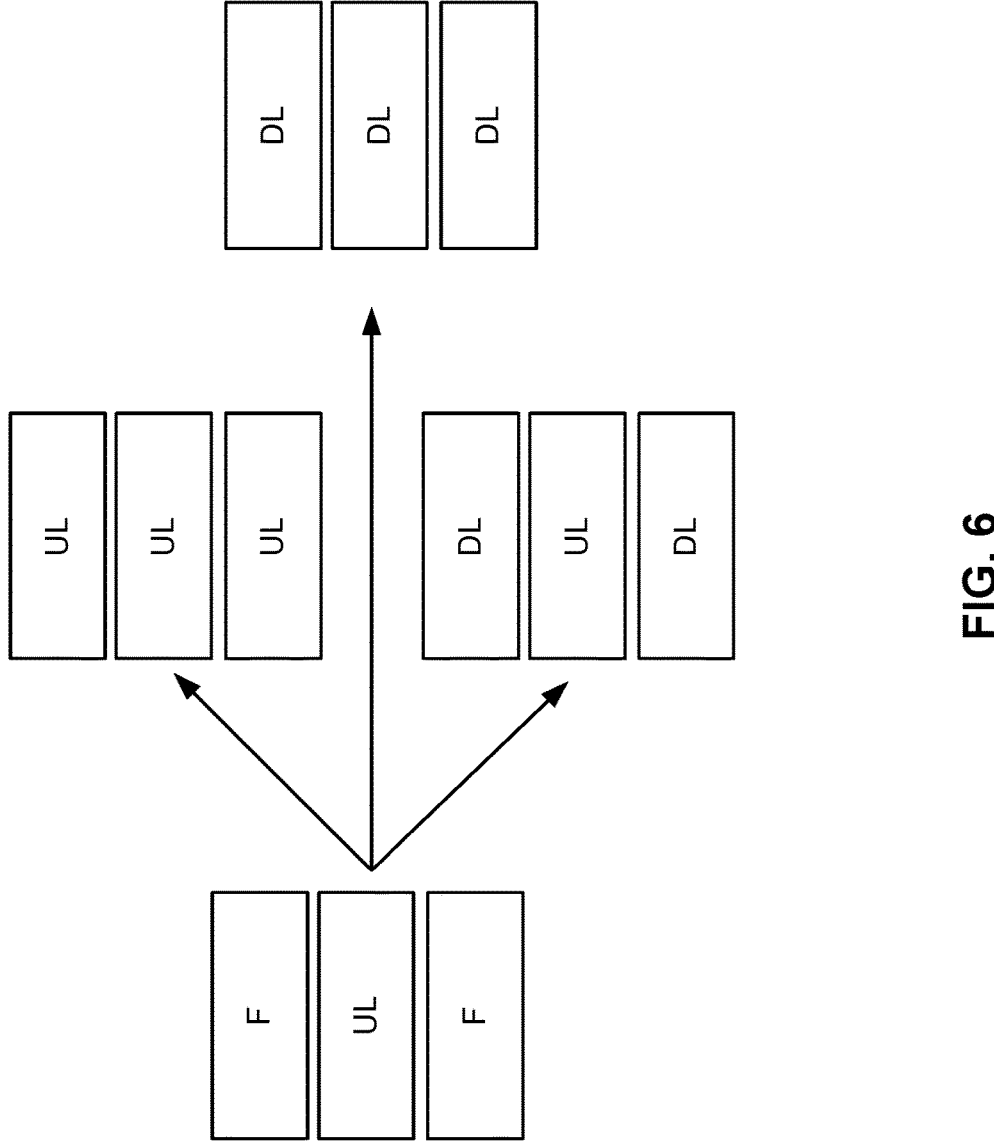
FIGS. 6-7 are diagrams illustrating examples of dynamic subband full duplex (SBFD), in accordance with the present disclosure.

In a first option, dynamic SBFD may be achieved by a scheduling DCI, which may indicate whether resource block(s) (RB(s)) in a flexible subband are used for an uplink transmission or a downlink transmission (e.g., as shown in FIG. 6). The flexible subband may be one RB or a set of consecutive flexible RBs, which may be used for the uplink transmission, the downlink transmission, and/or a guard band. The flexible subband(s) may be used in addition to uplink/downlink subbands.

Figure 7:
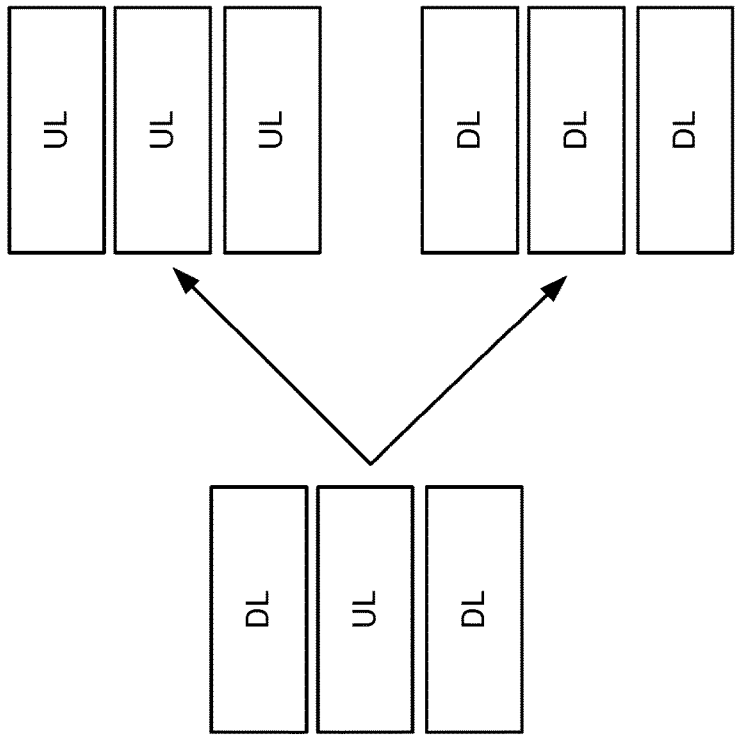

In a second option, dynamic SBFD may be achieved by a scheduling DCI, which may be used to determine whether downlink receptions outside a semi-statically configured downlink subband and/or uplink transmissions outside a semi-statically configured uplink subband are allowed (e.g., as shown in FIG. 7). An explicit indication in the scheduling DCI may indicate whether a symbol is an SBFD symbol or a full-downlink/full-uplink symbol, or whether downlink receptions outside the semi-statically configured downlink subband and/or uplink transmissions outside the semi-statically configured uplink subband are allowed. An implicit indication in the scheduling DCI may be based at least in part on a resource allocation.

In a third option, dynamic SBFD may be achieved by a non-scheduling DCI, which may indicate whether a symbol is an SBFD symbol or a non-SBFD symbol.

FIG. 6 is a diagram illustrating examples 600 of dynamic SBFD, in accordance with the present disclosure.

As shown in FIG. 6, in dynamic SBFD, RBs in a flexible subband may be used for an uplink transmission or a downlink transmission. In a first case, when the RBs in the flexible subband are used for the uplink transmission, a slot may become associated with a first uplink subband, a second uplink subband, and a third uplink subband (e.g., all subbands of the slot are uplink subbands). In a second case, when the RBs in the flexible subband and RBs in an uplink subband are used for the downlink transmission, the slot may become associated with a first downlink subband, a second downlink subband, and a third downlink subband (e.g., the slot may become a full downlink slot). In a third case, when the RBs in the flexible subband are used for the downlink transmission, the slot may become associated with a first uplink subband, a downlink subband, and a second uplink subband.

As indicated above, FIG. 6 is provided as an example. Other examples may differ from what is described with regard to FIG. 6.

FIG. 7 is a diagram illustrating examples 700 of dynamic SBFD, in accordance with the present disclosure.

As shown in FIG. 7, in dynamic SBFD, downlink receptions outside a semi-statically configured downlink subband and/or uplink transmissions outside a semi-statically configured uplink subband may be allowed. In a first case, for an SBFD slot that includes two downlink subbands and one uplink subband, the two downlink subbands may be changed to two uplink subbands (e.g., all subbands of the slot are uplink subbands). In a second case, for the SBFD slot that includes two downlink subbands and one uplink subband, the uplink subband may be changed to a downlink subband (e.g., all subbands of the slot are downlink subbands).

As indicated above, FIG. 7 is provided as an example. Other examples may differ from what is described with regard to FIG. 7.

In dynamic SBFD, a semi-statically configured SBFD slot may be dynamically updated to a downlink slot or a flexible slot. Additionally, or alternatively, in dynamic SBFD, a downlink slot or a flexible slot may be dynamically updated to an SBFD slot. Dynamic SBFD may be achieved using DCI (e.g., scheduling DCI or non-scheduling DCI). However, in some cases, the DCI may provide insufficient time for a network node and/or a UE to prepare for downlink receptions outside of a semi-statically configured downlink subband, and/or uplink transmissions outside of a semi-statically configured uplink subband, which may degrade a performance of the network node and/or the UE. Further, in some cases, the DCI may not trigger an ACK/NACK transmission by the UE, which may result in the network node being unaware when the DCI is not successfully received by the UE. In such a scenario, the performance of the network node and/or the UE may also be degraded.

In various aspects of techniques and apparatuses described herein, a UE may receive, from a network node, control information associated with dynamic SBFD. The UE may receive the control information via a scheduling DCI, a non-scheduling DCI, or a MAC control element (MAC-CE). The control information may indicate whether a downlink reception outside a semi-statically configured downlink subband or an uplink transmission outside a semi-statically configured uplink subband is allowed, or whether a symbol is an SBFD symbol or a non-SBFD symbol. In some aspects, the scheduling DCI may indicate a scheduling offset, which may provide a time period for the UE and/or the network node to prepare for the downlink reception outside the semi-statically configured downlink subband or the uplink transmission outside the semi-statically configured uplink subband. The scheduling offset, by enabling the time period for the UE and/or the network node, may improve a performance of the UE and/or the network node. In some aspects, the non-scheduling DCI may indicate an ACK/NACK location and an ACK/NACK resource for the non-scheduling DCI. The UE may transmit, to the network node, an ACK/NACK based at least in part on the control information. For example, the UE may transmit the ACK/NACK based at least in part on the ACK/NACK location and the ACK/NACK resource for the non-scheduling DCI. The non-scheduling DCI, by indicating the ACK/NACK location and the ACK/NACK resource, may enable ACK/NACK transmissions by the UE, thereby improving a performance of the UE and/or the network node. The UE may perform a communication based at least in part on the control information. For example, the UE may perform the downlink reception or the uplink transmission based at least in part on the control information. The UE may perform the communication in the SBFD symbol or in the non-SBFD symbol, based at least in part on the control information.

Figure 8:
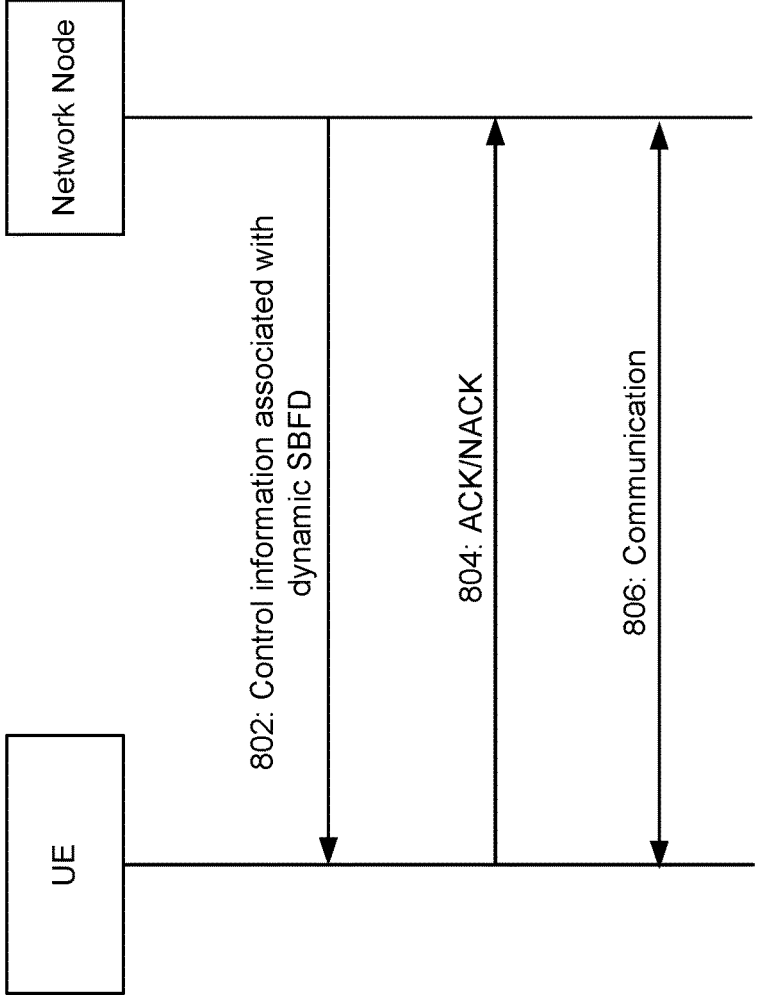

FIG. 8 is a diagram illustrating an example 800 associated with transmitting control information associated with dynamic SBFD, in accordance with the present disclosure. As shown in FIG. 8, example 800 includes communication between a UE (e.g., UE 120) and a network node (e.g., network node 110). In some aspects, the UE and the network node may be included in a wireless network, such as wireless network 100.

As shown by reference number 802, the UE may receive, from the network node, control information associated with dynamic SBFD. The UE may receive the control information via a scheduling DCI, a non-scheduling DCI, or a MAC-CE. The control information may indicate whether a downlink reception outside a semi-statically configured downlink subband or an uplink transmission outside a semi-statically configured uplink subband is allowed, or the control information may indicate whether a symbol is an SBFD symbol or a non-SBFD symbol. A semi-statically configured SBFD slot may be dynamically updated, based at least in part on the control information, to a downlink slot or a flexible slot. Alternatively, a downlink slot or a flexible slot may be dynamically updated, based at least in part on the control information, to an SBFD slot.

In some aspects, the UE may receive, from the network node, the control information via the scheduling DCI. The scheduling DCI may indicate a scheduling offset. The scheduling offset may provide a time period for the UE to prepare for the downlink reception outside the semi-statically configured downlink subband or the uplink transmission outside the semi-statically configured uplink subband. The UE may perform, during the time period based at least in part on the scheduling offset, a retuning of an RF filter or a baseband filter for the downlink reception outside the semi-statically configured downlink subband or the uplink transmission outside the semi-statically configured uplink subband. The UE may determine, during the time period based at least in part on the scheduling offset, an adjusted uplink UE TA for aligning a network node downlink and uplink timing. The adjusted uplink UE TA may be different on the SBFD symbol versus the non-SBFD symbol. The UE may perform, during the time period based at least in part on the scheduling offset, a downlink-to-uplink direction switch to allow the UE to switch an RF based at least in part on an uplink timing being advanced to a downlink direction.

In some aspects, in dynamic SBFD, the network node may transmit, to the UE, the scheduling DCI, which may indicate whether downlink receptions outside the semi-statically configured downlink subband and/or uplink transmissions outside the semi-statically configured uplink subband are allowed. The scheduling DCI may be configured with the scheduling offset, which may guarantee sufficient time for the network node and/or the UE to prepare for the downlink receptions outside the semi-statically configured downlink subband and/or the UL transmissions outside the semi-statically configured uplink subband. The network node and/or the UE may perform various actions during the time period, which may be based at least in part on the scheduling offset indicated in the scheduling DCI. For example, during the time period, the network node and/or the UE may retune certain RF/baseband blocks or filters for the downlink receptions outside the semi-statically configured downlink subband and/or the uplink transmissions outside the semi-statically configured uplink subband. During the time period, the network node and/or the UE may determine the adjusted uplink UE TA for aligning the network node downlink and uplink timing. The network node downlink and uplink timing may be aligned, for example, with TA offset 0 for an SBFD symbol and a non-zero TA offset for a legacy downlink or uplink symbol. During the time period, the UE may perform the downlink-to-uplink direction switch, which may allow the UE to switch RF, given that an uplink timing is advanced to downlink. During the time period, the network node may adopt different antenna configurations. For example, antenna elements or transceiver units (TxRUs) for SBFD symbols/slots may be different from antenna elements or TxRUs for non-SBFD/legacy downlink or uplink or flexible symbols/slots.

In some aspects, the scheduling offset may be in accordance with a minimum scheduling offset. The minimum scheduling offset may be based at least in part on a UE capability, or the minimum scheduling offset may be pre-defined in a specification. The scheduling offset may be associated with a minimum scheduling offset, which may be based at least in part on a UE capability. Alternatively, the minimum scheduling offset may be defined in a specification as a rule. In some aspects, the scheduling DCI may include an offset field that indicates the scheduling offset, and the offset field may reuse existing offset values or use newly defined candidate offset values. The scheduling offset may be indicated by the offset field in the scheduling DCI. The offset field may reuse an existing offset field and values, or larger candidate offset values may be defined in the specification.

In some aspects, the scheduling DCI may include an explicit indication that the UE is to prepare for the downlink reception, where the downlink reception may occur a first quantity (N) of resource blocks (RBs) outside semi-statically configured downlink subband(s), and remaining RBs in an uplink subband may be useable as uplink transmission resources. In some aspects, the scheduling DCI may include an explicit indication that the UE is to prepare for the uplink transmission, where the uplink transmission may occur a second quantity (M) of RBs outside the semi-statically configured uplink subband, and remaining RBs in one or more downlink subbands may be useable as downlink reception resources. In some aspects, the scheduling DCI may include an explicit indication that indicates whether the UE is to prepare for the downlink reception that is the first quantity of RBs outside the semi-statically configured downlink subband or the uplink transmission that is the second quantity of RBs outside the semi-statically configured uplink subband. The explicit indication may be based at least in part on a bitmap that is per RB or per RB set.

In some aspects, the scheduling DCI may include the explicit indication, which may indicate whether the symbol is the SBFD symbol or a full-downlink/full-uplink symbol, or whether the downlink receptions outside the semi-statically configured downlink subband and/or the uplink transmissions outside the semi-statically configured uplink subband are allowed. The UE, based at least in part on the explicit indication received from the network node, may be prepared for downlink receptions that are N RBs outside the semi-statically configured downlink subband, where remaining RBs in the uplink subband may still be used as transmission resources (e.g., at an uplink UE) (e.g., as shown in FIG. 9). Alternatively, the UE, based at least in part on the explicit indication received from the network node, may be prepared for uplink receptions that are M RBs outside the semi-statically configured uplink subband, where remaining RBs in downlink subband(s) may still be used as reception resources (e.g., at a downlink UE) (e.g., as shown in FIG. 9). In some aspects, the explicit indication may be based at least in part on the bitmap, where the bitmap may be per RB or per RB set. For example, within 20 MHz of an uplink subband, 5 MHz or 6 RBs may be used for downlink receptions by a downlink UE, and a remaining 15 MHz or 20 RBs may still be used for uplink transmissions by an uplink UE.

In some aspects, the UE may receive, from the network node, the control information via the non-scheduling DCI. The non-scheduling DCI may be associated with a DCI format without data scheduling. The non-scheduling DCI may include a first field that indicates that the non-scheduling DCI is associated with the dynamic SBFD. The first field may be configured with a sequence that is used to detect that the non-scheduling DCI is associated with the dynamic SBFD. The first field may be a frequency domain resource allocation (FDRA) field, a time domain resource allocation (TDRA) field, an MCS field, or another type of field. The non-scheduling DCI may include a second field that indicates whether the symbol is updated to be the SBFD symbol or the non-SBFD symbol for the downlink reception that is the first quantity of RBs outside the semi-statically configured downlink subband or the uplink transmission that is the second quantity of RBs outside the semi-statically configured uplink subband. The non-scheduling DCI may indicate only an ACK location, only a NACK location, or an ACK/NACK location for the non-scheduling DCI.

In some aspects, in dynamic SBFD, the network node may transmit, to the UE, the non-scheduling DCI, which may indicate whether the symbol is the SBFD symbol or the non-SBFD symbol. When the network node is configured to use the non-scheduling DCI to indicate whether the symbol is the SBFD symbol or not, the non-scheduling DCI may reuse DCI format 1_1, 1_2 without data scheduling, or DCI format 0_1, 0_2 without data scheduling. In some aspects, a field in the non-scheduling DCI may be used to indicate dynamic SBFD. For example, the field in the non-scheduling DCI may be used for such a dynamic SBFD indication purpose. The field in the non-scheduling DCI used to indicate the purpose of dynamic SBFD may be an FDRA field, a TDRA field, or the MCS field. Further, the network node may configure the sequence (e.g., a special sequence) in the field (e.g., 11111111). When receiving the sequence in the field, by a new rule, the UE may decode the field using the sequence, which may allow the UE to determine that the non-scheduling DCI is for a dynamic SBFD indication. In other words, the field in the non-scheduling DCI may be configured with the sequence, which may enable the UE to detect that the non-scheduling DCI is for the purpose of dynamic SBFD.

In some aspects, the non-scheduling DCI may include another field (e.g., an MCS field), which may be used to indicate whether the symbol is the SBFD symbol or the non-SBFD symbol. For example, when the other field includes one bit, then a bit value of "0" may indicate that the symbol is the non-SBFD symbol and a bit value of "1" may indicate that the symbol is the SBFD symbol, or vice versa.

In some aspects, in dynamic SBFD, the non-scheduling DCI may indicate the ACK/NACK location, which may differ from traditional non-scheduling DCIs (e.g., non-scheduling DCIs not used for dynamic SBFD), which do not trigger ACK/NACK transmissions. In order for the network node to determine whether the UE successfully received or did not receive the non-scheduling DCI for the dynamic SBFD indication, the non-scheduling DCI may indicate the ACK/NACK location for the non-scheduling DCI. For example, in an unused field or in a new field of the non-scheduling DCI, the network node may indicate that the UE is to transmit an ACK/NACK, only NACK, or only ACK in a physical uplink control channel (PUCCH) after N slots at the end of the non-scheduling DCI. The non-scheduling DCI may include a field that indicates a value for N.

In some aspects, the non-scheduling DCI may be associated with a DCI format of a group common DCI (GC-DCI). The non-scheduling DCI may indicate an ACK/NACK location for the non-scheduling DCI. The non-scheduling DCI may indicate an ACK/NACK resource for the UE. The non-scheduling DCI may indicate a common ACK/NACK resource for a plurality of UEs.

In some aspects, in dynamic SBFD, when the network node is configured to use the non-scheduling DCI to indicate whether the symbol is the SBFD symbol or not, the non-scheduling DCI may reuse DCI format 2_x of the GC-DCI. The non-scheduling DCI (e.g., the GC-DCI) may indicate the ACK/NACK location, which may differ from traditional non-scheduling DCIs, which do not trigger ACK/NACK transmissions. In order for the network node to determine whether the plurality of UEs (e.g., all UEs) successfully received or did not receive the non-scheduling DCI for the dynamic SBFD indication, the non-scheduling DCI may indicate the ACK/NACK location for the non-scheduling DCI.

In some aspects, in an unused field or in a new field of the non-scheduling DCI, the network node may indicate, to each UE, the ACK/NACK resource. For example, UE k may transmit an ACK/NACK in a PUCCH after N slots at the end of the non-scheduling DCI, UE k+1 may transmit an ACK/NACK in a PUCCH after N+1 slots at the end of the non-scheduling DCI, and so on. In some aspects, in the unused field or in the new field of the non-scheduling DCI, the network node may indicate the common ACK/NACK resource for the plurality of UEs (e.g., all UEs) in a group. For example, the plurality of UEs may transmit the ACK/NACK, only NACK, or only ACK in a PUCCH after N slots at the end of the non-scheduling DCI. When the network node receives one NACK from at least one UE, the network node may retransmit or multicast the non-scheduling DCI again to the plurality of UEs in the group.

As shown by reference number 804, the UE may transmit an ACK/NACK based at least in part on the control information. The UE may transmit the ACK/NACK based at least in part on the scheduling DCI, the non-scheduling DCI, or the MAC-CE. In some aspects, the UE may transmit the ACK/NACK in the PUCCH after a quantity of slots or symbols at an end of the non-scheduling DCI based at least in part on the ACK/NACK location indicated in the non-scheduling DCI. The UE, based at least in part on the ACK/NACK location indicated in the non-scheduling DCI, may transmit the ACK/NACK, only NACK, or only ACK in the PUCCH, which may be N slots after the end of the non-scheduling DCI.

As shown by reference number 806, the UE and/or the network node may perform a communication based at least in part on the control information. For example, the UE may perform the downlink reception outside the semi-statically configured downlink subband based at least in part on the control information. The UE may perform the uplink transmission outside the semi-statically configured uplink subband based at least in part on the control information. The UE and/or the network node may perform the communication in the SBFD symbol or in the non-SBFD symbol, based at least in part on the control information. The UE and/or the network node may perform the communication in an SBFD slot or in a non-SBFD slot (e.g., a downlink slot, an uplink slot, or a flexible slot), based at least in part on the control information.

As indicated above, FIG. 8 is provided as an example. Other examples may differ from what is described with regard to FIG. 8.

FIG. 9 is a diagram illustrating an example 900 associated with transmitting control information associated with dynamic SBFD, in accordance with the present disclosure.

As shown by reference number 902, a downlink reception may be associated with N RBs outside a semi-statically configured downlink subband. A semi-statically configured uplink subband may be reduced based at least in part on the N RBs, and remaining RBs in the uplink subband may still be used as transmission resources at an uplink UE. In dynamic SBFD, an explicit indication may enable a UE to be prepared for downlink receptions N RBs outside the semi-statically configured downlink subband.

As shown by reference number 904, an uplink transmission may be associated with M RBs outside a semi-statically configured uplink subband. A semi-statically configured downlink subband may be reduced based at least in part on the M RBs, and remaining RBs in the downlink subband (or multiple downlink subbands) may still be used as reception resources at a downlink UE. In dynamic SBFD, an explicit indication may enable a UE to be prepared for uplink transmissions M RBs outside the semi-statically configured uplink subband.

As indicated above, FIG. 9 is provided as an example. Other examples may differ from what is described with regard to FIG. 9.

FIG. 10 is a diagram illustrating an example process 1000 performed, for example, by a UE, in accordance with the present disclosure. Example process 1000 is an example where the UE (e.g., UE 120) performs operations associated with transmitting control information associated with dynamic SBFD.

As shown in FIG. 10, in some aspects, process 1000 may include receiving control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol (block 1010). For example, the UE (e.g., using reception component 1202 and/or communication manager 1206, depicted in FIG. 12) may receive control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol, as described above.

As further shown in FIG. 10, in some aspects, process 1000 may include performing a communication based at least in part on the control information (block 1020). For example, the UE (e.g., using transmission component 1204 and/or communication manager 1206, depicted in FIG. 12) may perform a communication based at least in part on the control information, as described above.

Process 1000 may include additional aspects, such as any single aspect or any combination of aspects described below and/or in connection with one or more other processes described elsewhere herein.

In a first aspect, a semi-statically configured SBFD slot is dynamically updated, based at least in part on the control information, to a downlink slot or a flexible slot.

In a second aspect, alone or in combination with the first aspect, a downlink slot or a flexible slot is dynamically updated, based at least in part on the control information, to an SBFD slot.

In a third aspect, alone or in combination with one or more of the first and second aspects, the control information is received via a scheduling DCI.

In a fourth aspect, alone or in combination with one or more of the first through third aspects, the scheduling DCI indicates a scheduling offset, and the scheduling offset provides a time period for the UE to prepare for the downlink reception outside the semi-statically configured downlink subband or the uplink transmission outside the semi-statically configured uplink subband.

In a fifth aspect, alone or in combination with one or more of the first through fourth aspects, process 1000 includes performing, during the time period based at least in part on the scheduling offset, a retuning of an RF filter or a baseband filter for the downlink reception outside the semi-statically configured downlink subband or the uplink transmission outside the semi-statically configured uplink subband.

In a sixth aspect, alone or in combination with one or more of the first through fifth aspects, process 1000 includes determining, during the time period based at least in part on the scheduling offset, an adjusted uplink UE TA for aligning a network node downlink and uplink timing, and the adjusted uplink UE timing advance is different on the SBFD symbol versus the non-SBFD symbol.

In a seventh aspect, alone or in combination with one or more of the first through sixth aspects, process 1000 includes performing, during the time period based at least in part on the scheduling offset, a downlink-to-uplink direction switch to allow the UE to switch an RF based at least in part on an uplink timing being advanced to a downlink direction.

In an eighth aspect, alone or in combination with one or more of the first through seventh aspects, the scheduling offset is in accordance with a minimum scheduling offset.

In a ninth aspect, alone or in combination with one or more of the first through eighth aspects, the minimum scheduling offset is based at least in part on a UE capability, or the minimum scheduling offset is predefined in a specification.

In a tenth aspect, alone or in combination with one or more of the first through ninth aspects, the scheduling DCI includes an offset field that indicates the scheduling offset, and the offset field reuses existing offset values or uses newly defined candidate offset values.

In an eleventh aspect, alone or in combination with one or more of the first through tenth aspects, the UE is a first UE, the scheduling DCI includes an explicit indication that the UE is to prepare for the downlink reception that is a first quantity of RBs outside one or more semi-statically configured downlink subbands, and remaining RBs in an uplink subband are useable as uplink transmission resources at a second UE.

In a twelfth aspect, alone or in combination with one or more of the first through eleventh aspects, the UE is a first UE, the scheduling DCI includes an explicit indication that the UE is to prepare for the uplink transmission that is a second quantity of RBs outside the semi-statically configured uplink subband, and remaining RBs in one or more downlink subbands are useable as downlink reception resources at a second UE.

In a thirteenth aspect, alone or in combination with one or more of the first through twelfth aspects, the scheduling DCI includes an explicit indication that indicates whether the UE is to prepare for the downlink reception that is a first quantity of RBs outside the semi-statically configured downlink subband or the uplink transmission that is a second quantity of RBs outside the semi-statically configured uplink subband, and the explicit indication is based at least in part on a bitmap that is per RB or per RB set.

In a fourteenth aspect, alone or in combination with one or more of the first through thirteenth aspects, the control information is received via a non-scheduling DCI.

In a fifteenth aspect, alone or in combination with one or more of the first through fourteenth aspects, the non-scheduling DCI is associated with a DCI format without data scheduling.

In a sixteenth aspect, alone or in combination with one or more of the first through fifteenth aspects, the non-scheduling DCI includes a first field that indicates the non-scheduling DCI is associated with the dynamic SBFD, and the first field is configured with a sequence that is used to detect that the non-scheduling DCI is associated with the dynamic SBFD.

In a seventeenth aspect, alone or in combination with one or more of the first through sixteenth aspects, the first field is an FDRA field, a TDRA field, an MCS field, or another type of field.

In an eighteenth aspect, alone or in combination with one or more of the first through seventeenth aspects, the non-scheduling DCI includes a second field that indicates whether a symbol is updated to be the SBFD symbol or the non-SBFD symbol for the downlink reception that is a first quantity of RBs outside the semi-statically configured downlink subband or the uplink transmission that is a second quantity of RBs outside the semi-statically configured uplink subband.

In a nineteenth aspect, alone or in combination with one or more of the first through eighteenth aspects, the non-scheduling DCI indicates an ACK or NACK location for the non-scheduling DCI, and process 1000 includes transmitting the ACK or the NACK in a PUCCH after a quantity of slots or symbols at an end of the non-scheduling DCI based at least in part on the ACK or NACK location indicated in the non-scheduling DCI.

In a twentieth aspect, alone or in combination with one or more of the first through nineteenth aspects, the non-scheduling DCI is associated with a DCI format of a GC-DCI.

In a twenty-first aspect, alone or in combination with one or more of the first through twentieth aspects, the non-scheduling DCI indicates only an ACK location, only a NACK location, or an ACK/NACK location for the non-scheduling DCI.

In a twenty-second aspect, alone or in combination with one or more of the first through twenty-first aspects, the non-scheduling DCI indicates an ACK or NACK resource for the UE.

In a twenty-third aspect, alone or in combination with one or more of the first through twenty-second aspects, the non-scheduling DCI indicates a common ACK or NACK resource for a plurality of UEs.

In a twenty-fourth aspect, alone or in combination with one or more of the first through twenty-third aspects, the control information is received via a MAC-CE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a network node, in accordance with the present disclosure. Example process 1100 is an example where the network node (e.g., network node 110) performs operations associated with transmitting control information associated with dynamic SBFD.

As shown in FIG. 11, in some aspects, process 1100 may include transmitting control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol (block 1110). For example, the network node (e.g., using transmission component 1304 and/or communication manager 1306, depicted in FIG. 13) may transmit control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol, as described above.

As further shown in FIG. 11, in some aspects, process 1100 may include performing a communication based at least in part on the control information (block 1120). For example, the network node (e.g., using reception component 1302 and/or communication manager 1306, depicted in FIG. 13) may perform a communication based at least in part on the control information, as described above.

Process 1100 may include additional aspects, such as any single aspect or any combination of aspects described below and/or in connection with one or more other processes described elsewhere herein.

In a first aspect, a semi-statically configured SBFD slot is dynamically updated, based at least in part on the control information, to a downlink slot or a flexible slot.

In a second aspect, alone or in combination with the first aspect, a downlink slot or a flexible slot is dynamically updated, based at least in part on the control information, to an SBFD slot.

In a third aspect, alone or in combination with one or more of the first and second aspects, the control information is received via a scheduling DCI.

In a fourth aspect, alone or in combination with one or more of the first through third aspects, the scheduling DCI indicates a scheduling offset, and the scheduling offset provides a time period for the network node to prepare for the downlink reception outside the semi-statically configured downlink subband or the uplink transmission outside the semi-statically configured uplink subband.

In a fifth aspect, alone or in combination with one or more of the first through fourth aspects, process 1100 includes performing, during the time period based at least in part on the scheduling offset, a retuning of an RF filter or a baseband filter for the downlink reception outside the semi-statically configured downlink subband or the uplink transmission outside the semi-statically configured uplink subband.

In a sixth aspect, alone or in combination with one or more of the first through fifth aspects, process 1100 includes determining, during the time period based at least in part on the scheduling offset, an adjusted uplink UE TA for aligning a network node downlink and uplink timing, and the adjusted uplink UE timing advance is different on the SBFD symbol versus the non-SBFD symbol.

In a seventh aspect, alone or in combination with one or more of the first through sixth aspects, process 1100 includes adopting, during the time period based at least in part on the scheduling offset, a different antenna configuration, wherein a first antenna configuration is associated with antenna elements or TxRUs for SBFD symbols or slots, and a second antenna configuration is associated with non-SBFD, downlink, uplink, or flexible symbols or slots.

In an eighth aspect, alone or in combination with one or more of the first through seventh aspects, the scheduling offset is in accordance with a minimum scheduling offset.

In a ninth aspect, alone or in combination with one or more of the first through eighth aspects, the minimum scheduling offset is based at least in part on a UE capability, or the minimum scheduling offset is predefined in a specification.

In a tenth aspect, alone or in combination with one or more of the first through ninth aspects, the scheduling DCI includes an offset field that indicates the scheduling offset, and the offset field reuses existing offset values or uses newly defined candidate offset values.

In an eleventh aspect, alone or in combination with one or more of the first through tenth aspects, the scheduling DCI includes an explicit indication that a UE is to prepare for the downlink reception that is a first quantity of RBs outside the semi-statically configured downlink subband, and remaining RBs in an uplink subband are useable as uplink transmission resources.

In a twelfth aspect, alone or in combination with one or more of the first through eleventh aspects, the scheduling DCI includes an explicit indication that a UE is to prepare for the uplink transmission that is a second quantity of RBs outside the semi-statically configured uplink subband, and remaining RBs in one or more downlink subbands are useable as downlink reception resources.

In a thirteenth aspect, alone or in combination with one or more of the first through twelfth aspects, the scheduling DCI includes an explicit indication that indicates whether the UE is to prepare for the downlink reception that is a first quantity of resource blocks (RBs) outside the semi-statically configured downlink subband or the uplink transmission that is a second quantity of RBs outside the semi-statically configured uplink subband, and the explicit indication is based at least in part on a bitmap that is per RB or per RB set.

In a fourteenth aspect, alone or in combination with one or more of the first through thirteenth aspects, the control information is received via a non-scheduling DCI.

In a fifteenth aspect, alone or in combination with one or more of the first through fourteenth aspects, the non-scheduling DCI is associated with a DCI format without data scheduling.

In a sixteenth aspect, alone or in combination with one or more of the first through fifteenth aspects, the non-scheduling DCI includes a first field that indicates the non-scheduling DCI is associated with the dynamic SBFD, and the first field is configured with a sequence that is used to detect that the non-scheduling DCI is associated with the dynamic SBFD.

In a seventeenth aspect, alone or in combination with one or more of the first through sixteenth aspects, the first field is an FDRA field, a TDRA field, an MCS field, or another type of field.

In an eighteenth aspect, alone or in combination with one or more of the first through seventeenth aspects, the non-scheduling DCI includes a second field that indicates whether a symbol is updated to be the SBFD symbol or the non-SBFD symbol for the downlink reception that is a first quantity of RBs outside the semi-statically configured downlink subband or the uplink transmission that is a second quantity of RBs outside the semi-statically configured uplink subband.

In a nineteenth aspect, alone or in combination with one or more of the first through eighteenth aspects, the non-scheduling DCI indicates an ACK or NACK location for the non-scheduling DCI, and process 1100 includes receiving the ACK or the NACK in a PUCCH after a quantity of slots or symbols at an end of the non-scheduling DCI based at least in part on the ACK or NACK location indicated in the non-scheduling DCI.

In a twentieth aspect, alone or in combination with one or more of the first through nineteenth aspects, the non-scheduling DCI is associated with a DCI format of a GC-DCI.

In a twenty-first aspect, alone or in combination with one or more of the first through twentieth aspects, the non-scheduling DCI indicates only an ACK location, only a NACK location, or an ACK/NACK location for the non-scheduling DCI.

In a twenty-second aspect, alone or in combination with one or more of the first through twenty-first aspects, the non-scheduling DCI indicates an ACK or NACK resource for a UE.

In a twenty-third aspect, alone or in combination with one or more of the first through twenty-second aspects, the non-scheduling DCI indicates a common ACK or NACK resource for a plurality of a UEs.

In a twenty-fourth aspect, alone or in combination with one or more of the first through twenty-third aspects, the control information is received via a MAC-CE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
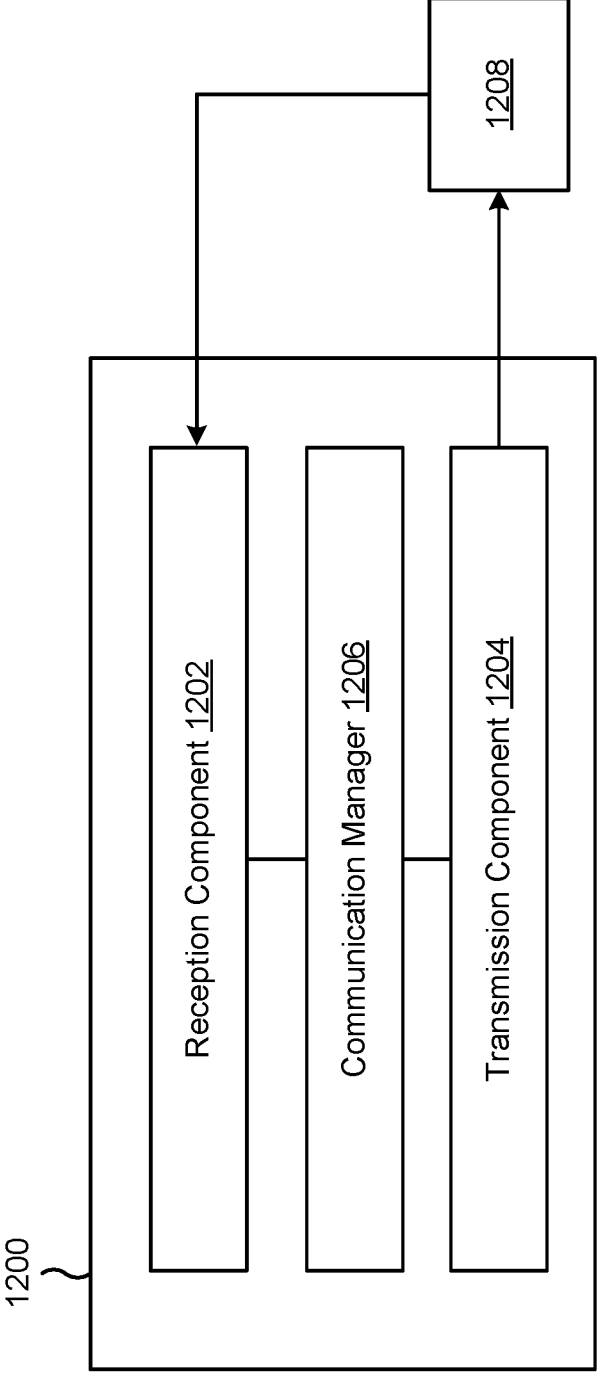
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 8-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol. The reception component 1202 and/or the transmission component 1204 may perform a communication based at least in part on the control information.

The communication manager 1206 may perform, during the time period based at least in part on the scheduling offset, a retuning of an RF filter or a baseband filter for the downlink reception outside the semi-statically configured downlink subband or the uplink transmission outside the semi-statically configured uplink subband. The communication manager 1206 may determine, during the time period based at least in part on the scheduling offset, an adjusted uplink UE TA for aligning a network node downlink and uplink timing. The communication manager 1206 may perform, during the time period based at least in part on the scheduling offset, a downlink-to-uplink direction switch to allow the UE to switch an RF based at least in part on an uplink timing being advanced to a downlink direction.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
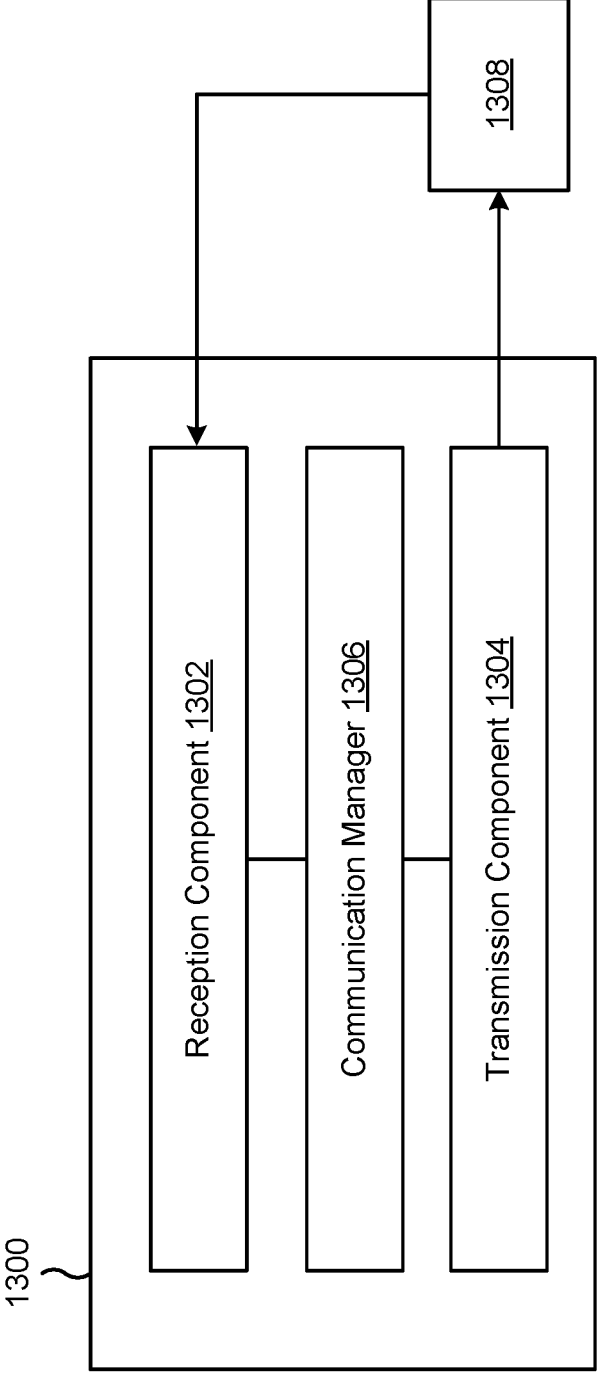

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 8-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit control information associated with dynamic SBFD, wherein the control information indicates whether a downlink reception outside a semi-statically configured downlink subband or an uplink transmission outside a semi-statically configured uplink subband is allowed, or whether a symbol is an SBFD symbol or a non-SBFD symbol. The reception component 1302 and/or the transmission component 1304 may perform a communication based at least in part on the control information.

The communication manager 1306 may perform, during the time period based at least in part on the scheduling offset, a retuning of an RF filter or a baseband filter for the downlink reception outside the semi-statically configured downlink subband or the uplink transmission outside the semi-statically configured uplink subband. The communication manager 1306 may determine, during the time period based at least in part on the scheduling offset, an adjusted uplink UE TA for aligning a network node downlink and uplink timing. The communication manager 1306 may adopt, during the time period based at least in part on the scheduling offset, a different antenna configuration, wherein a first antenna configuration is associated with antenna elements or TxRUs for SBFD symbols or slots, and a second antenna configuration is associated with non-SBFD, downlink, uplink, or flexible symbols or slots.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving control information associated with dynamic subband full duplex (SBFD), wherein the control information indicates whether a downlink reception outside a semi-statically configured downlink subband or an uplink transmission outside a semi-statically configured uplink subband is allowed, or whether a symbol is an SBFD symbol or a non-SBFD symbol; and transmitting an acknowledgement (ACK) or a negative acknowledgement (NACK) based at least in part on the control information.

Aspect 2: The method of Aspect 1, wherein a semi-statically configured SBFD slot is dynamically updated, based at least in part on the control information, to a downlink slot or a flexible slot.

Aspect 3: The method of any of Aspects 1-2, wherein a downlink slot or a flexible slot is dynamically updated, based at least in part on the control information, to an SBFD slot.

Aspect 4: The method of any of Aspects 1-3, wherein the control information is received via a scheduling downlink control information (DCI).

Aspect 5: The method of Aspect 4, wherein the scheduling DCI indicates a scheduling offset, and the scheduling offset provides a time period for the UE to prepare for the downlink reception outside the semi-statically configured downlink subband or the uplink transmission outside the semi-statically configured uplink subband.

Aspect 6: The method of Aspect 5, further comprising: performing, during the time period based at least in part on the scheduling offset, a retuning of a radio frequency (RF) filter or a baseband filter for the downlink reception outside the semi-statically configured downlink subband or the uplink transmission outside the semi-statically configured uplink subband.

Aspect 7: The method of Aspect 5, further comprising: determining, during the time period based at least in part on the scheduling offset, an adjusted uplink UE timing advance for aligning a network node downlink and uplink timing, wherein the adjusted uplink UE timing advance is different on the SBFD symbol versus the non-SBFD symbol.

Aspect 8: The method of Aspect 5, further comprising: performing, during the time period based at least in part on the scheduling offset, a downlink-to-uplink direction switch to allow the UE to switch a radio frequency (RF) based at least in part on an uplink timing being advanced to a downlink direction.

Aspect 9: The method of Aspect 5, wherein the scheduling offset is in accordance with a minimum scheduling offset.

Aspect 10: The method of Aspect 9, wherein the minimum scheduling offset is based at least in part on a UE capability, or the minimum scheduling offset is predefined in a specification.

Aspect 11: The method of Aspect 5, wherein the scheduling DCI includes an offset field that indicates the scheduling offset, and the offset field reuses existing offset values or uses newly defined candidate offset values.

Aspect 12: The method of Aspect 4, wherein the UE is a first UE, the scheduling DCI includes an explicit indication that the UE is to prepare for the downlink reception that is a first quantity of resource blocks (RBs) outside one or more semi-statically configured downlink subbands, and remaining RBs in an uplink subband are useable as uplink transmission resources at a second UE.

Aspect 13: The method of Aspect 4, wherein the UE is a first UE, the scheduling DCI includes an explicit indication that the UE is to prepare for the uplink transmission that is a second quantity of RBs outside the semi-statically configured uplink subband, and remaining RBs in one or more downlink subbands are useable as downlink reception resources at a second UE.

Aspect 14: The method of Aspect 4, wherein the scheduling DCI includes an explicit indication that indicates whether the UE is to prepare for the downlink reception that is a first quantity of resource blocks (RBs) outside the semi-statically configured downlink subband or the uplink transmission that is a second quantity of RBs outside the semi-statically configured uplink subband, and the explicit indication is based at least in part on a bitmap that is per RB or per RB set.

Aspect 15: The method of any of Aspects 1-14, wherein the control information is received via a non-scheduling downlink control information (DCI).

Aspect 16: The method of Aspect 15, wherein the non-scheduling DCI is associated with a DCI format without data scheduling.

Aspect 17: The method of Aspect 15, wherein the non-scheduling DCI includes a first field that indicates the non-scheduling DCI is associated with the dynamic SBFD, and the first field is configured with a sequence that is used to detect that the non-scheduling DCI is associated with the dynamic SBFD.

Aspect 18: The method of Aspect 17, wherein the first field is a frequency domain resource allocation (FDRA) field, a time domain resource allocation (TDRA) field, a modulation and coding scheme (MCS) field, or another type of field.

Aspect 19: The method of Aspect 15, wherein the non-scheduling DCI includes a second field that indicates whether a symbol is updated to be the SBFD symbol or the non-SBFD symbol for the downlink reception that is a first quantity of resource blocks (RBs) outside the semi-statically configured downlink subband or the uplink transmission that is a second quantity of RBs outside the semi-statically configured uplink subband.

Aspect 20: The method of Aspect 15, wherein the non-scheduling DCI indicates an ACK or NACK location for the non-scheduling DCI, and further comprising: transmitting the ACK or the NACK in a physical uplink control channel (PUCCH) after a quantity of slots or symbols at an end of the non-scheduling DCI based at least in part on the ACK or NACK location indicated in the non-scheduling DCI.

Aspect 21: The method of Aspect 15, wherein the non-scheduling DCI is associated with a DCI format of a group common DCI (GC-DCI).

Aspect 22: The method of Aspect 21, wherein the non-scheduling DCI indicates only an acknowledgement (ACK) location, only a negative acknowledgement (NACK) location, or an ACK or a NACK location for the non-scheduling DCI.

Aspect 23: The method of Aspect 22, wherein the non-scheduling DCI indicates an ACK or NACK resource for the UE.

Aspect 24: The method of Aspect 22, wherein the non-scheduling DCI indicates a common ACK or NACK resource for a plurality of UEs.

Aspect 25: The method of any of Aspects 1-24, wherein the control information is received via a medium access control control element (MAC-CE).

Aspect 26: A method of wireless communication performed by a network node, comprising: transmitting control information associated with dynamic subband full duplex (SBFD), wherein the control information indicates whether a downlink reception outside a semi-statically configured downlink subband or an uplink transmission outside a semi-statically configured uplink subband is allowed, or whether a symbol is an SBFD symbol or a non-SBFD symbol; and receiving an acknowledgement (ACK) or a negative acknowledgement (NACK) based at least in part on the control information.

Aspect 27: The method of Aspect 26, wherein a semi-statically configured SBFD slot is dynamically updated, based at least in part on the control information, to a downlink slot or a flexible slot.

Aspect 28: The method of any of Aspects 26-27, wherein a downlink slot or a flexible slot is dynamically updated, based at least in part on the control information, to an SBFD slot.

Aspect 29: The method of any of Aspects 26-28, wherein the control information is received via a scheduling downlink control information (DCI).

Aspect 30: The method of Aspect 29, wherein the scheduling DCI indicates a scheduling offset, and the scheduling offset provides a time period for the network node to prepare for the downlink reception outside the semi-statically configured downlink subband or the uplink transmission outside the semi-statically configured uplink subband.

Aspect 31: The method of Aspect 30, further comprising: performing, during the time period based at least in part on the scheduling offset, a retuning of a radio frequency (RF) filter or a baseband filter for the downlink reception outside the semi-statically configured downlink subband or the uplink transmission outside the semi-statically configured uplink subband.

Aspect 32: The method of Aspect 30, further comprising: determining, during the time period based at least in part on the scheduling offset, an adjusted uplink UE timing advance for aligning a network node downlink and uplink timing, wherein the adjusted uplink UE timing advance is different on the SBFD symbol versus the non-SBFD symbol.

Aspect 33: The method of Aspect 30, further comprising: adopting, during the time period based at least in part on the scheduling offset, a different antenna configuration, wherein a first antenna configuration is associated with antenna elements or transceiver units (TxRUs) for SBFD symbols or slots, and a second antenna configuration is associated with non-SBFD, downlink, uplink, or flexible symbols or slots.

Aspect 34: The method of Aspect 30, wherein the scheduling offset is in accordance with a minimum scheduling offset.

Aspect 35: The method of Aspect 34, wherein the minimum scheduling offset is based at least in part on a user equipment (UE) capability, or the minimum scheduling offset is predefined in a specification.

Aspect 36: The method of Aspect 30, wherein the scheduling DCI includes an offset field that indicates the scheduling offset, and the offset field reuses existing offset values or uses newly defined candidate offset values.

Aspect 37: The method of Aspect 29, wherein the scheduling DCI includes an explicit indication that a user equipment (UE) is to prepare for the downlink reception that is a first quantity of resource blocks (RBs) outside the semi-statically configured downlink subband, and remaining RBs in an uplink subband are useable as uplink transmission resources.

Aspect 38: The method of Aspect 29, wherein the scheduling DCI includes an explicit indication that a user equipment (UE) is to prepare for the uplink transmission that is a second quantity of resource blocks (RBs) outside the semi-statically configured uplink subband, and remaining RBs in one or more downlink subbands are useable as downlink reception resources.

Aspect 39: The method of Aspect 29, wherein the scheduling DCI includes an explicit indication that indicates whether the UE is to prepare for the downlink reception that is a first quantity of resource blocks (RBs) outside the semi-statically configured downlink subband or the uplink transmission that is a second quantity of RBs outside the semi-statically configured uplink subband, and the explicit indication is based at least in part on a bitmap that is per RB or per RB set.

Aspect 40: The method of any of Aspects 26-39, wherein the control information is received via a non-scheduling downlink control information (DCI).

Aspect 41: The method of Aspect 40, wherein the non-scheduling DCI is associated with a DCI format without data scheduling.

Aspect 42: The method of Aspect 40, wherein the non-scheduling DCI includes a first field that indicates the non-scheduling DCI is associated with the dynamic SBFD, and the first field is configured with a sequence that is used to detect that the non-scheduling DCI is associated with the dynamic SBFD.

Aspect 43: The method of Aspect 42, wherein the first field is a frequency domain resource allocation (FDRA) field, a time domain resource allocation (TDRA) field, a modulation and coding scheme (MCS) field, or another type of field.

Aspect 44: The method of Aspect 40, wherein the non-scheduling DCI includes a second field that indicates whether a symbol is updated to be the SBFD symbol or the non-SBFD symbol for the downlink reception that is a first quantity of resource blocks (RBs) outside the semi-statically configured downlink subband or the uplink transmission that is a second quantity of RBs outside the semi-statically configured uplink subband.

Aspect 45: The method of Aspect 40, wherein the non-scheduling DCI indicates an ACK or NACK location for the non-scheduling DCI, and further comprising: receiving the ACK or the NACK in a physical uplink control channel (PUCCH) after a quantity of slots or symbols at an end of the non-scheduling DCI based at least in part on the ACK or NACK location indicated in the non-scheduling DCI.

Aspect 46: The method of Aspect 40, wherein the non-scheduling DCI is associated with a DCI format of a group common DCI (GC-DCI).

Aspect 47: The method of Aspect 46, wherein the non-scheduling DCI indicates only an acknowledgement (ACK)

location, only a negative acknowledgement (NACK) location, or an ACK or a NACK location for the non-scheduling DCI.

Aspect 48: The method of Aspect 47, wherein the non-scheduling DCI indicates an ACK or NACK resource for a user equipment (UE).

Aspect 49: The method of Aspect 47, wherein the non-scheduling DCI indicates a common ACK or NACK resource for a plurality of a user equipments (UEs).

Aspect 50: The method of any of Aspects 26-49, wherein the control information is received via a medium access control control element (MAC-CE).

Aspect 51: An apparatus for wireless communication at a device, comprising a processor; memory coupled with the processor; and instructions stored in the memory and executable by the processor to cause the apparatus to perform the method of one or more of Aspects 1-25.

Aspect 52: A device for wireless communication, comprising a memory and one or more processors coupled to the memory, the one or more processors configured to perform the method of one or more of Aspects 1-25.

Aspect 53: An apparatus for wireless communication, comprising at least one means for performing the method of one or more of Aspects 1-25.

Aspect 54: A non-transitory computer-readable medium storing code for wireless communication, the code comprising instructions executable by a processor to perform the method of one or more of Aspects 1-25.

Aspect 55: A non-transitory computer-readable medium storing a set of instructions for wireless communication, the set of instructions comprising one or more instructions that, when executed by one or more processors of a device, cause the device to perform the method of one or more of Aspects 1-25.

Aspect 56: An apparatus for wireless communication at a device, comprising a processor; memory coupled with the processor; and instructions stored in the memory and executable by the processor to cause the apparatus to perform the method of one or more of Aspects 26-50.

Aspect 57: A device for wireless communication, comprising a memory and one or more processors coupled to the memory, the one or more processors configured to perform the method of one or more of Aspects 26-50.

Aspect 58: An apparatus for wireless communication, comprising at least one means for performing the method of one or more of Aspects 26-50.

Aspect 59: A non-transitory computer-readable medium storing code for wireless communication, the code comprising instructions executable by a processor to perform the method of one or more of Aspects 26-50.

Aspect 60: A non-transitory computer-readable medium storing a set of instructions for wireless communication, the set of instructions comprising one or more instructions that, when executed by one or more processors of a device, cause the device to perform the method of one or more of Aspects 26-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors coupled to the one or more memories, the one or more processors individually or collectively configured to:

receive control information associated with dynamic subband full duplex (SBFD), wherein the control information indicates that a downlink reception outside a semi-statically configured downlink subband or an uplink transmission outside a semi-statically configured uplink subband is allowed, or whether a symbol is an SBFD symbol or a non-SBFD symbol, wherein the control information is received via a scheduling downlink control information (DCI), the scheduling DCI indicates a scheduling offset, and the scheduling offset provides a time period for the UE to prepare for the downlink reception outside the semi-statically configured downlink subband or the uplink transmission outside the semi-statically configured uplink subband; and perform a communication based at least in part on the control information.

2. The apparatus of claim 1,
wherein a semi-statically configured SBFD slot is dynamically updated, based at least in part on the control information, to a downlink slot or a flexible slot.

3. The apparatus of claim 1,
wherein a downlink slot or a flexible slot is dynamically updated, based at least in part on the control information, to an SBFD slot.

4. The apparatus of claim 1,
wherein the one or more processors are further individually or collectively configured to:
perform, during the time period based at least in part on the scheduling offset, a retuning of a radio frequency (RF) filter or a baseband filter for the downlink reception outside the semi-statically configured downlink subband or the uplink transmission outside the semi-statically configured uplink subband.

5. The apparatus of claim 1,
wherein the one or more processors are further individually or collectively configured to:
determine, during the time period based at least in part on the scheduling offset, an adjusted uplink UE timing advance for aligning a network node downlink and uplink timing, wherein the adjusted uplink UE timing advance is different on the SBFD symbol versus the non-SBFD symbol.

6. The apparatus of claim 1,
wherein the one or more processors are further individually or collectively configured to:
perform, during the time period based at least in part on the scheduling offset, a downlink-to-uplink direction switch to allow the UE to switch a radio frequency (RF) based at least in part on an uplink timing being advance to a downlink direction.

7. The apparatus of claim 1,
wherein the scheduling offset is in accordance with a minimum scheduling offset.

8. The apparatus of claim 7,
wherein the minimum scheduling offset is based at least in part on a UE capability, or the minimum scheduling offset is predefined in a specification.

9. The apparatus of claim 1,
wherein the scheduling DCI includes an offset field that indicates the scheduling offset, and the offset field reuses existing offset values or uses newly defined candidate offset values.

10. The apparatus of claim 1,
wherein the UE is a first UE, the scheduling DCI includes an explicit indication that the UE is to prepare for the downlink reception that is a first quantity of resource blocks (RBs) outside one or more semi-statically configured downlink subbands, and remaining RBs in an uplink subband are useable as uplink transmission resources at a second UE.

11. The apparatus of claim 1,
wherein the UE is a first UE, the scheduling DCI includes an explicit indication that the UE is to prepare for the uplink transmission that is a second quantity of resource blocks (RBs) outside the semi-statically configured uplink subband, and remaining RBs in one or more downlink subbands are useable as downlink reception resources at a second UE.

12. The apparatus of claim 1,
wherein the scheduling DCI includes an explicit indication that indicates whether the UE is to prepare for the downlink reception that is a first quantity of resource blocks (RBs) outside the semi-statically configured downlink subband or the uplink transmission that is a second quantity of RBs outside the semi-statically configured uplink subband, and the explicit indication is based at least in part on a bitmap that is per RB or per RB set.

13. The apparatus of claim 1,
wherein another control information is received via a non-scheduling downlink control information (DCI).

14. The apparatus of claim 13,
wherein the non-scheduling DCI is associated with a DCI format without data scheduling.

15. The apparatus of claim 13,
wherein the non-scheduling DCI includes a first field that indicates the non-scheduling DCI is associated with the dynamic SBFD, and the first field is configured with a sequence that is used to detect that the non-scheduling DCI is associated with the dynamic SBFD.

16. The apparatus of claim 15,
wherein the first field is a frequency domain resource allocation (FDRA) field, a time domain resource allocation (TDRA) field, a modulation and coding scheme (MCS) field, or another type of field.

17. The apparatus of claim 13,
wherein the non-scheduling DCI includes a second field that indicates whether a symbol is updated to be an SBFD symbol or a non-SBFD symbol for the downlink reception that is a first quantity of resource blocks (RBs) outside the semi-statically configured downlink subband or the uplink transmission that is a second quantity of RBs outside the semi-statically configured uplink subband.

18. The apparatus of claim 13,
wherein the non-scheduling DCI indicates an acknowledgement (ACK) or negative acknowledgement (NACK) location for the non-scheduling DCI, and
the one or more processors are further individually or collectively configured to:
transmit an ACK or a NACK in a physical uplink control channel (PUCCH) after a quantity of slots or symbols at an end of the non-scheduling DCI based at least in part on the ACK or NACK location indicated in the non-scheduling DCI.

19. The apparatus of claim 13,
wherein the non-scheduling DCI is associated with a DCI format of a group common DCI (GC-DCI).

20. The apparatus of claim 19,
wherein the non-scheduling DCI indicates only an acknowledgement (ACK) location, only a negative acknowledgement (NACK) location, or an ACK or a NACK location for the non-scheduling DCI.

21. The apparatus of claim 20,
wherein the non-scheduling DCI indicates an ACK or NACK resource for the UE.

22. The apparatus of claim 20,
wherein the non-scheduling DCI indicates a common ACK or NACK resource for a plurality of UEs.

23. The apparatus of claim 1,
wherein the control information is received via a medium access control control element (MAC-CE).

24. An apparatus for wireless communication at a network node, comprising:
one or more memories; and
one or more processors coupled to the one or more memories, the one or more processors individually or collectively configured to:
transmit control information associated with dynamic subband full duplex (SBFD), wherein the control information indicates that a downlink reception outside a semi-statically configured downlink subband or an uplink transmission outside a semi-statically configured uplink subband is allowed, or whether a symbol is an SBFD symbol or a non-SBFD symbol, wherein the control information is received via a scheduling downlink control information (DCI), the scheduling DCI indicates a scheduling offset, and the scheduling offset provides a time period for the network node to prepare for the downlink reception outside the semi-statically configured downlink subband or the uplink transmission outside the semi-statically configured uplink subband; and
perform a communication based at least in part on the control information.

25. The apparatus of claim 24,
wherein another control information is transmitted via a non-scheduling downlink control information (DCI), the non-scheduling DCI is associated with a DCI format without data scheduling, the non-scheduling DCI includes a first field that indicates the non-scheduling DCI is associated with the dynamic SBFD, the first field is configured with a sequence that is used to detect that the non-scheduling DCI is associated with the dynamic SBFD, and the non-scheduling DCI indicates an acknowledgement (ACK) or negative acknowledgement (NACK) location for the non-scheduling DCI.

26. A method of wireless communication performed by a user equipment (UE), comprising:
receiving control information associated with dynamic subband full duplex (SBFD), wherein the control information indicates that a downlink reception outside a semi-statically configured downlink subband or an uplink transmission outside a semi-statically configured uplink subband is allowed, or whether a symbol is an SBFD symbol or a non-SBFD symbol, wherein the control information is received via a scheduling downlink control information (DCI), the scheduling DCI indicates a scheduling offset, and the scheduling offset provides a time period for the UE to prepare for the downlink reception outside the semi-statically configured downlink subband or the uplink transmission outside the semi-statically configured uplink subband; and
performing a communication based at least in part on the control information.

27. The method of claim 26,
wherein a semi-statically configured SBFD slot is dynamically updated, based at least in part on the control information, to a downlink slot or a flexible slot.

28. The method of claim 26,
wherein a downlink slot or a flexible slot is dynamically updated, based at least in part on the control information, to an SBFD slot.

29. The method of claim 26, further comprising:
performing, during the time period based at least in part on the scheduling offset, a retuning of a radio frequency (RF) filter or a baseband filter for the downlink reception outside the semi-statically configured downlink subband or the uplink transmission outside the semi-statically configured uplink subband.

30. A method of wireless communication performed by a network node, comprising:
transmitting control information associated with dynamic subband full duplex (SBFD), wherein the control information indicates that a downlink reception outside a semi-statically configured downlink subband or an uplink transmission outside a semi-statically configured uplink subband is allowed, or whether a symbol is an SBFD symbol or a non-SBFD symbol, wherein the control information is received via a scheduling downlink control information (DCI), the scheduling DCI indicates a scheduling offset, and the scheduling offset provides a time period for the network node to prepare for the downlink reception outside the semi-statically configured downlink subband or the uplink transmission outside the semi-statically configured uplink subband; and
performing a communication based at least in part on the control information.

* * * * *